United States Patent
Bujard

(10) Patent No.: US 7,452,597 B2
(45) Date of Patent: *Nov. 18, 2008

(54) INTERFERENCE PIGMENTS COMPRISING A LAYER OF SILICON OXIDE

(75) Inventor: Patrice Bujard, Reinach (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/531,483

(22) PCT Filed: Nov. 3, 2003

(86) PCT No.: PCT/EP03/50777

§ 371 (c)(1), (2), (4) Date: Apr. 15, 2005

(87) PCT Pub. No.: WO2004/044060

PCT Pub. Date: May 27, 2004

(65) Prior Publication Data

US 2006/0099420 A1   May 11, 2006

(30) Foreign Application Priority Data

Nov. 13, 2002  (EP)  ................................. 02405978
Jan. 23, 2003  (EP)  ................................. 03405026

(51) Int. Cl.
 *B32B 5/16*   (2006.01)
(52) U.S. Cl. .................. 428/402; 106/436; 106/472; 106/475; 106/482; 428/403; 428/404
(58) Field of Classification Search .......... 428/402, 428/403, 404; 106/436, 472, 475, 482
See application file for complete search history.

(56) References Cited

U.S. PATENT DOCUMENTS

| 3,438,796 | A | * | 4/1969 | Hanke | 106/403 |
|---|---|---|---|---|---|
| 5,540,769 | A | | 7/1996 | Franz et al. | 106/415 |
| 5,766,335 | A | * | 6/1998 | Bujard et al. | 106/404 |
| 6,150,022 | A | | 11/2000 | Coulter et al. | 428/403 |
| 6,383,638 | B1 | | 5/2002 | Coulter et al. | 428/403 |
| 6,387,498 | B1 | | 5/2002 | Coulter et al. | 428/403 |
| 6,569,529 | B1 | | 5/2003 | Phillips et al. | 428/403 |
| 6,586,098 | B1 | * | 7/2003 | Coulter et al. | 428/403 |
| 7,060,126 | B2 | * | 6/2006 | Andes et al. | 106/415 |
| 7,273,522 | B2 | * | 9/2007 | Bujard et al. | 106/481 |
| 7,291,216 | B2 | * | 11/2007 | Bujard | 106/415 |
| 2003/0203222 | A1 | | 10/2003 | Phillips et al. | 428/472 |
| 2003/0203223 | A1 | | 10/2003 | Phillips et al. | 428/472 |
| 2003/0215641 | A1 | | 11/2003 | Phillips et al. | 428/406 |
| 2004/0131776 | A1 | * | 7/2004 | Weinert | 427/255.7 |
| 2005/0161678 | A1 | * | 7/2005 | Weinert et al. | 257/77 |
| 2006/0042507 | A1 | * | 3/2006 | Bujard et al. | 106/415 |

FOREIGN PATENT DOCUMENTS

| EP | 0803549 | 10/1997 |
|---|---|---|
| WO | 93/19131 | 9/1993 |
| WO | 00/34395 | 6/2000 |
| WO | 00/69975 | 11/2000 |
| WO | 02/31058 | 4/2002 |

* cited by examiner

*Primary Examiner*—H. T Le
(74) *Attorney, Agent, or Firm*—Joseph C. Suhadolnik

(57) ABSTRACT

The present invention relates to pigments, comprising
(A) optionally a layer consisting of a metal,
(B) at least one layer, which is located between the layers (A) and (C), if a layer (A) is present, and consists of the metal, silicon (Si) and oxygen (O), and
(C) optionally a layer consisting of $SiO_z$ with $0.70 \leq z \leq 2.0$ on layer (B), a process for the production of the pigments and their use in ink-jet printing, for dyeing textiles, for pigmenting coatings, paints, printing inks, plastics, cosmetics, glazes for ceramics and glass.

17 Claims, No Drawings

INTERFERENCE PIGMENTS COMPRISING A LAYER OF SILICON OXIDE

The present Invention relates to (interference) pigments, comprising at least one layer, which is obtained by calcining of a metal and $SiO_z$ with $0.70 \leq z \leq 2.0$, especially $1.1 \leq z \leq 2.0$, a method of producing the pigments and their use in ink-jet printing, for dyeing textiles, for pigmenting coatings, printing inks, plastics, cosmetics, glazes for ceramics and glass.

WO93/19131 disclose platelet-shaped colored pigments containing titanium dioxide, one or more suboxides of titanium and an oxide or oxides of one or more metals other than titanium or non-metals, wherein the concentration of the titanium oxides in the coating layer is maximum in the proxity of the substrate surface and gradually decreases toward the pigment surface.

WO00/34395, WO00/69975 and WO02/31058 describe bright metal flakes, $SiO_{y1}/Al/SiO_{y1}$, wherein y1 is from about 1 to about 2. The thickness of the aluminum layer is at least about 40 nm and the thickness of the $SiO_{y1}$ layer is at least 10 nm.

WO03/68868 describes a process for producing $SiO_y$ flakes. The $SiO_y$ flakes may be treated with a carbon-containing gas at from 500 to 1500° C., preferably from 500 to 1000° C., preferably with the exclusion of oxygen, wherein a SiC layer is formed on the $SiO_y$ flakes. Alternatively the $SiO_y$ flakes can be converted in $SiO_2$ flakes by heating them in an oxygen-containing atmosphere. The $SiO_2$ flakes can be used as substrates for interference pigments.

PCT/EP03/09296 discloses platelet-shaped pigments comprising a layer obtained by calcining $TiO_2/SiO_z$, wherein $0.03 \leq z \leq 2.0$, and their use in paints, textiles, ink-jet printing, cosmetics, coatings, plastics materials, printing inks, in glazes for ceramics and glass, and in security printing.

EP-A-803549 discloses coloured pigments containing (a) a core consisting of an essentially transparent or metallic reflecting material, and (b) at least a coating consisting essentially of one or more silicone oxides, the molar ratio of oxygen to a silicon being 0.25 to 0.95.

Surprisingly, it was found, that (colored) pigments could be obtained, if plane-parallel structures (flakes), comprising (A) at least one layer consisting of a metal and (C) at least one layer consisting of $SiO_z$ with $0.70 \leq z \leq 2.0$, especially $1.1 \leq z \leq 2.0$, are calcined in a non-oxidizing atmosphere.

It is assumed, that by calcining of metal/$SiO_y$ in a non-oxidizing atmosphere a layer, i.e. a layer (B), or a composite layer, layer (B)/layer (A)/layer (B) is obtained, whereby a change of the refractive index is caused. It is assumed, that the change of the refractive index is based on the oxidation of the metal by $SiO_y$. It is, for example, known that by heating of SiO and aluminum at 650° C. Si and $Al_2O_3$ are formed and that by heating of SiO and titanium at 900° C. titanium silicides are formed (New J. Chem., 2001, 25, 994-998).

Accordingly, the present invention relates to a pigment, comprising (A) optionally a layer consisting of a metal,
(B) at least one layer, which is located between the layers (A) and (C), if a layer (A) is present, and consists of the metal, silicon (Si) and oxygen (O), and
(C) optionally a layer consisting of $SiO_z$ with $0.70 \leq z \leq 2.0$ on layer (B).

The layer (B) is obtained by calcining pigments comprising
(A) a layer consisting of a metal, and
(C) a layer consisting of $SiO_y$ on the metal layer, with $0.70 \leq y \leq 1.80$, in a non-oxidizing atmosphere at a temperature above 600° C.

Pigments, which do not contain a layer (A) are preferred. That is, preferably the whole layer (A) is converted to the layer (B) during calcination in the non-oxidizing atmosphere.

The term "$SiO_z$ with $0.70 \leq z \leq 2.0$" means that the molar ratio of oxygen to silicon at the average value of the silicon oxide layer is from 0.70 to 2.0. The composition of the silicon oxide layer can be determined by ESCA (electron spectroscopy for chemical analysis).

The term "$SiO_y$ with $0.70 \leq y \leq 1.8$" means that the molar ratio of oxygen to silicon at the average value of the silicon oxide layer is from 0.70 to 1.80. The composition of the silicon oxide layer can be determined by ESCA (electron spectroscopy for chemical analysis).

According to the present invention the term "aluminum" comprises aluminum and alloys of aluminum. Alloys of aluminum are, for example, described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides of aluminum silicon, magnesium, manganese, copper, zinc, nickel, vanadium, lead, antimony, tin, cadmium, bismuth, titanium, chromium and/or iron in amounts of less than 20% by weight, preferably less than 10% by weight.

To further increases the light weather and chemical stability, the $SiO_y$ layer may be oxidized using an oxygen-containing gas such as, for example, air at a temperature of at least 200° C., especially at above 400° C., preferably in the form of loose material, in a fluidized bed or by introduction into an oxidizing flame, preferably at a temperature in the range from 500 to 1000° C.

A further subject of the present invention is the use of the pigments in ink-jet printing (EP 02405888), for dyeing textiles (EP 02405889), for pigmenting coatings, printing inks, plastics, cosmetics (PCT/EP03/09296), glazes for ceramics and glass and in security printing.

The pigments of the present invention are particles, which generally have a length of from 2 μm to 5 mm, a width of from 2 μm to 2 mm, and a thickness of from 20 nm to 2 μm, and a ratio of length to thickness of at least 2:1, wherein the particles contain a core having two substantially parallel faces, the distance between which is the shortest axis of the core, and further layers which have been deposited on the parallel faces, but not on the side surface, or on the whole surface of the pigments. The pigments of the present invention are characterized by the precisely defined thickness and smooth surface.

The metal of layer (A) can be, in principal, any metal that at the calcining step reacts with $SiO_y$ to form the layer (B). Ag, Al, Cu, Cr, Mo, Ni, Ti or alloys thereof are preferred, wherein Al is most preferred.

Preferably layer (A) or, if layer (A) is absent, layer (B) forms the core of the pigment. If layer (A) forms the core, additional layers (B) and/or (C) can be present only on one parallel face or on both parallel faces of the pigment (A/B/C or C/B/A/B/C). If layer (A) is absent and layer (B) forms the core, layer (C) can be present on only one parallel face or on both parallel faces of the pigment (B/C or C/B/C). The layers (B), if a layer (A) is present, and (C) are preferably arranged in symmetrical order around the core. The layers (B) and/or (C) arranged in symmetrical order around the core can have different thicknesses, but have preferably the same thickness.

If $Al/SiO_y/Al$ flakes are calcined in a non-oxidising atmosphere the following pigments and/or substrates for (interference pigments) can be obtained:
(A1) a layer consisting of a metal, especially aluminum,
(B) a layer arranged between the layers (A1) and (A2) and consisting of metal, Si and O, and (A2) a layer consisting of a metal, especially aluminum; or
(A1) a layer consisting of a metal, especially aluminum,
(B1) a layer arranged between the layers (A1) and (C) and consisting of metal, Si and O,
(C) a layer consisting of $SiO_y$,
(B2) a layer arranged between the layers (C) and (A2) and consisting of metal, Si and O, and
(A2) a layer consisting of a metal, especially aluminum.

In a preferred embodiment the pigment comprises
(C1) a layer consisting of $SiO_y$,
(B) a layer arranged between the layers (C1) and (C2) and consisting of metal, Si and O, and
(C2) a layer consisting of $SiO_y$.

The $SiO_y$ of layers (C1) and (C2) may be oxidised using an oxygen-containing gas such as, for example, air at a temperature of at least 200° C., especially at above 400° C., preferably in the form of loose material, in a fluidised bed or by introduction into an oxidising flame, preferably at a temperature in the range from 500 to 1000° C., resulting in pigments, comprising
(C1) a layer consisting of $SiO_z$,
(B) a layer arranged between the layers (C1) and (C2) and consisting of metal, Si and O, and
(C2) a layer consisting of $SiO_z$.

In this embodiment the layer (B) preferably forms the core of the pigment, wherein (C1) and (C2) are only present on the parallel faces of the core.

In a further preferred embodiment the pigment comprises
(C1) a layer consisting of $SiO_z$,
(B1) a layer arranged between the layers (C1) and (A) and consisting of metal, Si and O,
(A) a layer consisting of a metal, especially aluminum,
(B2) a layer arranged between the layers (A) and (C2) and consisting of metal, Si and O, and
(C2) a layer consisting of $SiO_z$; which is obtainable by calcining of $SiO_y$/metal/$SiO_y$ flakes in a non-oxidizing atmosphere.

In this embodiment the layer (A) preferably forms the core of the pigment, wherein (B1), (B2), (C1) and (C2) are only present on the parallel faces of the core.

Colored (interference) pigments having high color strength and color purity can be obtained when the above pigments are coated with a material of high refractive index.

Accordingly, in a further embodiment the present invention relates to colored (interference) pigments, comprising
(D1) a layer of a material of high refractive index, especially $TiO_2$,
(C1) a layer consisting of $SiO_z$,
(B) a layer arranged between the layers (C1) and (C2) and consisting of metal, Si and O, and
(C2) a layer consisting of $SiO_z$, and
(D2) a layer of a material of high refractive index, especially $TiO_2$, wherein $0.70 \leq z \leq 2.0$, especially $1.10 \leq z \leq 2.0$, more especially $1.40 \leq z \leq 2.0$.

In this embodiment the layer (B) preferably forms the core of the pigment, wherein (C1) and (C2) are only present on the parallel faces of the core. The layer (D2) of the material of high refractive index, especially $TiO_2$, can be present only on layers (C1) and (C2), but is preferably present on the whole surface of the pigment.

In one preferred embodiment of the present invention, the interference pigments comprise materials having a "high" index of refraction, which is defined herein as an index of refraction of greater than about 1.65, and optionally materials having a "low" index of refraction, which is defined herein as an index of refraction of about 1.65 or less. Various (dielectric) materials that can be utilized include inorganic materials such as metal oxides, metal suboxides, metal fluorides, metal oxyhalides, metal sulfides, metal chalcogenides, metal nitrides, metal oxynitrides, metal carbides, combinations thereof, and the like, as well as organic dielectric materials. These materials are readily available and easily applied by physical, or chemical vapor deposition processes, or by wet chemical coating processes.

In an especially preferred embodiment, the interference pigments on the basis of the silicon oxide/metal substrate comprises a further layer of a dielectric material having a "high" refractive index, that is to say a refractive index greater than about 1.65, preferably greater than about 2.0, most preferred greater than about 2.2, which is applied to the entire surface of the silicon oxide/metal substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$), or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$, iron titanate, iron oxide hydrates, titanium suboxides, or $ZnO_1$ with $TiO_2$ being especially preferred.

It is possible to obtain pigments that are more intense in color and more transparent by applying, on top of the $TiO_2$ layer, a metal oxide of low refractive index. Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference. $SiO_2$, $Al_2O_3$, AlOOH, $B_2O_3$, or a mixture thereof, are preferred. $SiO_2$ is most preferred.

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A45 851), by means of hydrolytic gaseous phase decomposition of metal alcoholates (e.g.

titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised bed reactor (EP-A-045 851 and EP-A-106 235). $Al_2O_3$ layers (B) can advantageously be obtained by controlled oxidation during the cooling of aluminium-coated pigments, which is otherwise carried out under inert gas (DE-A-195 16 181).

Phosphate-, chromate- and/or vanadate-containing and also phosphate- and $SiO_2$-containing metal oxide layers can be applied in accordance with the passivation methods described in DE-A42 36 332 and in EP-A-678 561 by means of hydrolytic or oxidative gaseous phase decomposition of oxide-halides of the metals (e.g. $CrO_2Cl_2$, $VOCl_3$), especially of phosphorus oxyhalides (e.g. $POCl_3$), phosphoric and phosphorous acid esters (e.g. di- and tri-methyl and di- and tri-ethyl phosphite) and of amino-group-containing organyl silicon compounds (e.g. 3-aminopropyl-triethoxy- and -trimethoxy-silane).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, WO 98/53001 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707,050 or WO93/19131.

For the purpose of coating, the substrate particles are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcinated, it being possible to optimise the calcinating temperature with respect to the coating in question. If desired, after individual coatings have been applied, the pigments can be separated off, dried and, where appropriate, calcinated, and then again re-suspended for the purpose of precipitating further layers.

The metal oxide layers are also obtainable, for example, in analogy to a method described in DE-A-195 01 307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxy-propylamine. The organic solvent is a water-miscible organic solvent such as a $C_{1-4}$alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate is preferred. In addition, acetylacetonates and acetoacetylacetonates of the aforementioned metals may be used. Preferred examples of that type of metal acid ester are zirconium acetylacetonate, aluminium acetylacetonate, titanium acetylacetonate and diisobutyloleyl acetoacetylaluminate or diisopropyloleyl acetoacetylacetonate and mixtures of metal acid esters, for example Dynasil® (Hüls), a mixed aluminium/silicon metal acid ester.

As a metal oxide having a high refractive index, titanium dioxide is preferably used, the method described in U.S. Pat. No. 3,553,001 being used, in accordance with an embodiment of the present invention, for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as a titration method, is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment. By adding small amounts of $SnO_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

The $TiO_2$ can optionally be reduced by usual procedures: U.S. Pat. No. 4,948,631 ($NH_3$, 750-850° C), WO93/19131 ($H_2$, >900° C.) or DE-A-19843014 (solid reduction agent, such as, for example, silicon, >600° C.).

Where appropriate, an $SiO_2$ (protective) layer can be applied on top of the titanium dioxide layer, for which the following method may be used: A soda waterglass solution is metered into a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

It is possible to obtain pigments that are more intense in colour and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof, preferably $SiO_2$, and applying a further $Fe_2O_3$ and/or $TiO_2$ layer on top of the latter layer. Such multi-coated interference pigments comprising a silicon oxide/metal substrate and alternating metal oxide layers of with high and low refractive index can be prepared in analogy to the processes described in WO98/53011 and WO99/20695.

It is, in addition, possible to modify the powder colour of the pigment by applying further layers such as, for example, coloured metal oxides or Berlin Blue, compounds of transition metals, e.g. Fe, Cu, Ni, Co, Cr, or organic compounds such as dyes or colour lakes.

In addition, the pigment according to the invention can also be coated with poorly soluble, firmly adhering, inorganic or organic colourants. Preference is given to the use of colour lakes and, especially, aluminium colour lakes. For that purpose an aluminium hydroxide layer is precipitated, which is, in a second step, laked by using a colour lake (DE-A-24 29 762 and DE 29 28 287).

Furthermore, the pigment according to the invention may also have an additional coating with complex salt pigments, especially cyanoferrate complexes (EP-A-141 173 and DE-A-23 13 332).

To enhance the weather and light stability the multilayer silicon oxide flakes can be, depending on the field of application, subjected to a surface treatment. Useful surface treatments are, for example, described in DE-C-2215191, DE-A-3151354, DE-A-3235017, DE-A-3334598, DE-A-4030727, EP-A-649886, WO97/29059, WO99/57204, and U.S. Pat. No. 5,759,255. Said surface treatment might also facilitate the handling of the pigment, especially its incorporation into various application media.

Instead of the layer of the material having a high index of refraction a semitransparent metal layer can be applied. Suitable metals for the semi-transparent metal layer are, for example, Cr, Ti, Mo, W, Al, Cu, Ag, Au, or Ni. The semitransparent metal layer has typically a thickness of between 5 and 25 nm, especially between 5 and 15 nm. The semitransparent metal layer can be applied by PVD.

Alternatively the metal layer can be obtained by wet chemical coating or by chemical vapor deposition, for example, gas phase deposition of metal carbonyls. The substrate is suspended in an aqueous and/or organic solvent containing medium in the presence of a metal compound and is deposited onto the substrate by addition of a reducing agent. The metal compound is, for example, silver nitrate or nickel acetyl acetonate (WO03/37993).

According to U.S. Pat. No. 3,536,520 nickel chloride can be used as metal compound and hypophosphite can be used as reducing agent. According to EP-A-353544 the following compounds can be used as reducing agents for the wet chemical coating: aldehydes (formaldehyde, acetaldehyde, benzaldehyde), ketones (acetone), carboxylic acids and salts thereof (tartaric acid, ascorbic acid), reductones (isoascorbic acid, triosereductone, reductic acid), and reducing sugars (glucose).

In another preferred embodiment of the present invention layer (B) in the above described preferred embodiments can be replaced by a structure layer (B)/Layer (A)/layer (B), wherein instead of layer (B) layer (B)/Layer (A)/layer (B) forms the core of the pigment, If in the above decribed embodiments aluminum is used as metal, the thickness of layer (B) and/or layer (A) and (B), if layer (A) is present, is generally in the range of 5 to 100 nm, especially 30 to 60 nm.

The thickness of the $SiO_z$ layer ($0.70 \leq z \leq 2.0$) is generally 10 to 1000 nm. The preferred thickness of the $SiO_z$ layer depends on the desired color. Thicknesses of the $SiO_z$ layer above 500 nm lead to matt colors.

The $TiO_2$ layer is preferably deposited by a wet chemical process. The thickness of the $TiO_2$ layer is generally 5 to 200 nm, especially 10 to 100 nm, more especially 20 to 50 nm. The present invention is illustrated in more detail on the basis of aluminum as metal and $TiO_2$ as material of high refractive index.

The Al flakes coated with $SiO_y$ are prepared by a process comprising the following steps (EP-B-990715):
a) vapor-deposition of a separating agent onto a (movable) carrier to produce a separating agent layer,
b) deposition-deposition of an $SiO_y$ layer onto the separating agent layer, wherein $0.70 \leq y \leq 1.80$,
c) deposition-deposition of an Al layer onto the $SiO_y$ layer,
d) deposition of an $SiO_y$ layer onto the Al layer,
e) dissolution of the separating agent layer in a solvent, and
f) separation of the $SiO_y$ from the solvent.

The $SiO_y$ layer being deposited-deposited from a vaporizer containing a charge comprising a mixture of Si and $SiO_2$, SiO or a mixture thereof, the weight ratio of Si to $SiO_2$ being preferably in the range from 0.15:1 to 0.75:1, and especially containing a stoichiometric mixture of Si and $SiO_2$. The $SiO_{1.00-1.8}$ layer is formed preferably from silicon monoxide vapour produced in the vaporiser by reaction of a mixture of Si and $SiO_2$ at temperatures of more than 1300° C. The $SiO_{0.70-0.99}$ layer is formed preferably by evaporating silicon monoxide containing silicon in an amount up to 20% by weight at temperatures of more than 1300° C.

The Al flakes coated with $SiO_y$ according to the above process have a high plane-parallelism and a defined thickness in the range of ±10%, especially ±5% of the average thickness and low reflectivity.

The $SiO_y$ layer in step b) and d) being deposited-deposited from a vaporizer containing a charge comprising a mixture of Si and $SiO_2$, $SiO_y$ or a mixture thereof, the weight ratio of Si to $SiO_2$ being preferably in the range from 0.15:1 to 0.75:1, and especially containing a stoichiometric mixture of Si and $SiO_2$. Step e) being advantageously carried out at a pressure that is higher than the pressure in steps a) and b) and lower than atmospheric pressure. The $SiO_y$-coated Al flakes obtainable by this method have a thickness in the range preferably from 20 to 2000 nm, especially from 20 to 500 nm, most preferred from 20 to 200 nm, the ratio of the thickness to the surface area of the plane-parallel structures being preferably less than 0.01 $\mu m^{-1}$ and the aspect ratio being at least 2:1. The silicon oxide/aluminum flakes are not of a uniform shape. Nevertheless, for purposes of brevity, the flakes will be referred to as having a "diameter." The silicon oxide/aluminum flakes have a high plane-parallelism and a defined thickness in the range of ±10%, especially ±5% of the average thickness. The silicon oxide/aluminum flakes have a thickness of from 20 to 2000 nm, very especially from 100 to 350 nm. It is presently preferred that the diameter of the flakes be in a preferred range of about 1-60 $\mu m$ with a more preferred range of about 5-40 $\mu m$. Thus, the aspect ratio of the flakes of the present invention is in a preferred range of about 14 to 400.

The silicon oxide layer ($SiO_y$) in step b) and d) is formed preferably from silicon monoxide vapor produced in the vaporizer by reaction of a mixture of Si and $SiO_2$ at temperatures of more than 1300° C. The $SiO_{0.70-0.99}$ layer is formed preferably by evaporating silicon monoxide containing silicon in an amount up to 20% by weight at temperatures of more than 1300° C.

The deposition-deposition in steps a) and b) is carried out preferably under a vacuum of <0.5 Pa. The dissolution of the separating agent layer in step e) is carried out at a pressure in the range preferably from 1 to $5 \times 10^4$ Pa, especially from 600 to $10^4$ Pa, and more especially from $10^3$ to $5 \times 10^3$ Pa.

The separating agent deposited-deposited onto the carrier in step a) may be a lacquer, a polymer, such as, for example, the (thermoplastic) polymers, in particular acryl- or styrene polymers or mixtures thereof, as described in U.S. Pat. No. 6,398,999, an organic substance soluble in organic solvents or water and vaporizable in vacuo, such as anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol or a mixture of at least two of those substances. The separating agent is preferably an inorganic salt soluble in water and vaporizable in vacuo (see, for example, DE 198 44 357), such as sodium chloride, potassium chloride, lithium chloride, sodium fluoride, potassium fluoride, lithium fluoride, calcium fluoride, sodium aluminium fluoride and disodium tetraborate.

The movable carrier may consist of one or more discs, cylinders or other rotationally symmetrical bodies, which rotate about an axis (cf. WO01/25500), and consists preferably of one or more continuous metal belts with or without a polymeric coating or of one or more polyimide or polyethylene terephthalate belts (U.S. Pat. No. 6,270,840).

Step f) may comprise washing-out and subsequent filtration, sedimentation, centrifugation, decanting and/or evaporation. The plane-parallel structures of $SiO_y$ may, however, also be frozen together with the solvent in step d) and subsequently subjected to a process of freeze-drying, whereupon the solvent is separated off as a result of sublimation below the triple point and the dry $SiO_y$ remains behind in the form of individual plane-parallel structures.

Except under an ultra-high vacuum, in technical vacuums of a few $10^{-2}$ Pa vaporized SiO always condenses as $SiO_y$ wherein $1 \leq y \leq 1.8$, especially wherein $1.1 \leq y \leq 1.8$, because high-vacuum apparatuses always contain, as a result of gas emission from surfaces, traces of water vapor which react with the readily reactive SiO at vaporization temperature.

On its further course, the belt-form carrier, which is closed to form a loop, runs through dynamic vacuum lock chambers of known mode of construction (cf. U.S. Pat. No. 6,270,840) into a region of from 1 to $5 \times 10^4$ Pa pressure, preferably from 600 to $10^4$ Pa pressure, and especially from $10^3$ to $5 \times 10^3$ Pa pressure, where it is immersed in a dissolution bath. The temperature of the solvent should be so selected that its vapor pressure is in the indicated pressure range. With mechanical assistance, the separating agent layer rapidly dissolves and the product layer breaks up into flakes, which are then present in the solvent in the form of a suspension. On its further course, the belt is dried and freed from any contaminants still adhering to it. It runs through a second group of dynamic vacuum lock chambers back into the vaporization chamber, where the process of coating with separating agent and product layer of $SiO_y/Al/SiO_y$ is repeated.

The suspension then present in both cases, comprising product structures and solvent, and the separating agent dissolved therein, is then separated in a further operation in accordance with a known technique. For that purpose, the product structures are first concentrated in the liquid and rinsed several times with fresh solvent in order to wash out the dissolved separating agent. The product, in the form of a solid that is still wet, is then separated off by filtration, sedimentation, centrifugation, decanting or evaporation.

The product can then be brought to the desired particle size by means of ultrasound or by mechanical means using high-speed stirrers in a liquid medium, or after drying the fragments in an air-jet mill having a rotary classifier, or means of grinding or air-sieving and delivered for further use.

In detail, a salt, for example NaCl, followed by layers of silicon suboxide ($SiO_y$), aluminum and $SiO_y$ are successively deposited-deposited onto a carrier, which may be a continuous metal belt, passing by way of the vaporizers under a vacuum of <0.5 Pa. The deposited-deposited thicknesses of salt are approximately from 20 to 100 nm, preferably from 30 to 60 nm, and those of SiO are, depending on the intended use of the product, from 10 to 1000 nm, and those of aluminum from 10 to 100 nm.

On its further course, the belt-form carrier, which is closed to form a loop, runs through dynamic vacuum lock chambers of known mode of construction (cf. U.S. Pat. No. 6,270,840) into a region of from 1 to $5 \times 10^4$ Pa pressure, preferably from 600 to $10^4$ Pa pressure, and especially from $10^3$ to $5 \times 10^3$ Pa pressure, where it is immersed in a dissolution bath. The temperature of the solvent should be so selected that its vapor pressure is in the indicated pressure range. With mechanical assistance, the separating agent layer rapidly dissolves and the product layer breaks up into flakes, which are then present in the solvent in the form of a suspension. On its further course, the belt is dried and freed from any contaminants still adhering to it. It runs through a second group of dynamic vacuum lock chambers back into the vaporization chamber, where the process of coating with separating agent and product layer of SiO is repeated.

The suspension then present in both cases, comprising product structures and solvent, and the separating agent dissolved therein, is then separated in a further operation in accordance with a known technique. For that purpose, the product structures are first concentrated in the liquid and rinsed several times with fresh solvent in order to wash out the dissolved separating agent. The product, in the form of a solid that is still wet, is then separated off by filtration, sedimentation, centrifugation, decanting or evaporation.

The product can then be brought to the desired particle size by means of ultrasound or by mechanical means using high-speed stirrers in a liquid medium, or after drying the fragments in an air-jet mill having a rotary classifier, or means of grinding or air-sieving and delivered for further use.

Separating off the plane-parallel structures after washing-out at atmospheric pressure can be carried out under gentle conditions by freezing the suspension, which has been concentrated to a solids content of about 50%, and subjecting it in known manner to freeze-drying at about −10° C. and 50 Pa pressure. The dry substance remains behind as product, which can be subjected to the steps of further processing by means of coating or chemical conversion.

Hence, a further aspect of the present invention is formed by plane-parallel structures, comprising (A) a layer consisting of a metal, especially aluminum, and (C) at least one layer consisting of $SiO_z$, wherein $0.70 \leq z \leq 2.0$, especially $1.10 \leq z \leq 2.0$, more especially $1.40 \leq z \leq 2.0$.

For the further processing of the Al flakes coated with $SiO_y$, different variants are possible:

Variant (1): calcination in a non-oxidizing atmosphere (→layer (B)), calcination in the presence of oxygen ($SiO_z \rightarrow SiO_2$) and optionally coating of the obtained pigments with $TiO_2$ ($TiO_2/SiO_z$/core/$SiO_z/TiO_2$), wherein core=layer (B) or layer (B)/layer (A)/layer (B).

Variant (2): calcination in a non-oxidizing atmosphere (→layer (B)), coating of the obtained pigments with $TiO_2$ ($TiO_2/SiO_y/core/SiO_y/TiO_2$) and optionally calcination in the presence of oxygen ($SiO_y \rightarrow SiO_z$) ($TiO_2/SiO_z/core/SiO_z/TiO_2$).

Variant (3): calcination in a non-oxidizing atmosphere ($\rightarrow$layer (B)), coating of the obtained pigments with $TiO_2$, calcination in a non-oxidizing atmosphere ($\rightarrow$layer (E)) ($TiO_2$/layer (E)/$SiO_y$/core/$SiO_y$/layer (E)/$TiO_2$) and optionally calcination in the presence of oxygen ($SiO_y \rightarrow SiO_z$ ) ($TiO_2$/layer (E)/$SiO_z$/core/$SiO_z$/layer (E)/$TiO_2$).

Variant (4): coating of the obtained pigments with $TiO_2$, calcination in a non-oxidizing atmosphere ($\rightarrow$layer (B) and layer (E)) ($TiO_2$/layer (E)/$SiO_y$/Kern/$SiO_y$/layer (E)/$TiO_2$) and (E)/$SiO_z$/core/$SiO_z$/layer (E)/$TiO_2$)

The different variants are illustrated in more detail on the basis variants (1) and (4):

Variant (1) ($TiO_2/SiO_z/Core/SiO_z/TiO_2$):

The $SiO_y$-coated metal platelets are calcined in a non-oxidizing gaseous atmosphere at a temperature above 600° C., preferably in the range of from 700 to 1100° C. for more then 10 minutes, preferably for several hours. The calcination is conducted in a non-oxidizing gaseous atmosphere, such as, for example, Ar and/or He, wherein Ar is preferred, optionally under reduced pressure, preferably a pressure of less than 700 Torr (0,9333 $10^5$ N/m$^2$).

The $SiO_y$-coated metal platelets can then be subjected to oxidative heat treatment For example, air or some other oxygen-containing gas is passed through the platelets, which are in the form of loose material or in a fluidized bed, at a temperature of more than 200° C., preferably more than 400° C. and especially from 500 to 1000° C., wherein $SiO_y$ is oxidized to $SiO_z$.

The $TiO_2$ coating can easily be applied to the $SiO_y$-coated metal platelets by physical, or chemical vapor deposition processes, or by wet chemical coating processes.

For the purpose of coating, the substrate particles are suspended in water and one or more hydrolysable titanium salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcined, it being possible to optimize the calcining temperature with respect to the coating in question. If desired, after individual coatings have been applied, the pigments can be separated off, dried and, where appropriate, calcined, and then again re-suspended for the purpose of precipitating further layers.

The metal oxide layers are obtainable, for example, in analogy to a method described in DE-A-195 01 307, by producing the titanium oxide layer by controlled hydrolysis of one or more titanium acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxypropylamine. The organic solvent is a water-miscible organic solvent such as a $C_{1-4}$alcohol, especially isopropanol.

Suitable titanium acid esters are selected from alkyl and aryl alcoholates, carboxylates, and carboxyl-radical- or alkyl-radical- or aryl-radical-substituted alkyl alcoholates or carboxylates of titanium. The use of tetraisopropyl titanate is preferred. In addition, acetylacetonates and acetoacetylacetonates of titanium may be used. A preferred example of that type of titanium acid ester is titanium acetylacetonate.

In accordance with an embodiment of the present invention, the method described in U.S. Pat. No. 3,553,001 is used for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as a titration method, is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment. By adding small amounts of $SnO_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

The product can then be brought to the desired particle size by means of ultrasound or by mechanical means using high-speed stirrers in a liquid medium, or after drying the fragments in an air-jet mill having a rotary classifier, or means of grinding or air-sieving and delivered for further use.

It is possible for the weathering resistance to be increased by means of an additional coating, which at the same time causes an optimal adaptation to the binder system (EP-A-268918 and EP-A-632109).

Variant (4) ($TiO_2$/Layer (E)/$SiO_z$/Core/$SiO_z$/Layer (E)/$TiO_2$:

As described above the $SiO_y$-coated metal platelets are coated with $TiO_2$ and then calcined in a non-oxidizing atmosphere. In this way an additional layer (E) is produced besides the layer (B), which is formed by calcination of $TiO_2/SiO_y$. It is assumed that calcining $TiO_2/SiO_y$ in a non-oxidizing atmosphere produces an intermediate layer that causes a change in the refractive index. However, the possibility that the intermediate layer is not a continuous layer and that, rather, only individual regions at the interface of $TiO_2$ and $SiO_y$ undergo a conversion that causes a change in the refractive index cannot be ruled out. It is further assumed that the change in the refractive index is due to the reduction of $TiO_2$ by $SiO_y$. The principle according to the invention is based, therefore, on producing, by reduction of $TiO_2$ with $SiO_y$, an intermediate layer that causes a change in the refractive index.

$$TiO_2 + SiO_y \rightarrow SiO_{y+a} + TiO_{2-a}$$

Instead of $TiO_2$, another metal oxide that has a refractive index greater than 1.5 and that could be reduced by $SiO_y$, such as, for example, $Fe_2O_3$, could also be used.

Accordingly, further preferred embodiments of the present invention are directed to pigments having a layer structure, $TiO_2/SiO_z$/core/$SiO_z/TiO_2$, wherein the core is formed of a layer (B) or of a layer (B)/layer (A)/layer (B), wherein the layer (B) is only applied to the plane-parallel faces, but not the side faces of layer (A), wherein the $SiO_y$ layer is only present on the plane-parallel faces, but not the side faces and the $TiO_2$ layer is applied to the whole surface; as well as pigments having a layer structure, $TiO_2$/layer (E)/$SiO_y$/core/$SiO_y$/layer (E)/$TiO_2$, wherein the core is formed of a layer (B) or of a layer (B)/layer (A)/layer (B), wherein the layer (B) is only applied to the plane-parallel faces, but not the side faces of layer (A), wherein the $SiO_y$ layer and the layer (E) is only present on the plane-parallel faces, but not the side faces and the $TiO_2$ layer is applied to the whole surface. In this embodiment the layer (A) consists preferably of aluminum. The layer (B) is preferably derived from aluminum.

If desired, the $TiO_2$ can be reduced to titanium suboxides by usual methods, as described, for example in U.S. Pat. No. 4,948,631, JP H4-20031, DE-A-19618562 and DE-A-198 43 014).

It is possible to obtain pigments that are more intense in color and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof preferably $SiO_2$ and applying a further $Fe_2O_3$ and/or $TiO_2$ layer on top of the latter layer. Such multi-coated interference pigments comprising a silicon oxide substrate and alternating metal oxide layers of with high and low refractive index can be prepared in analogy to the processes described in WO98/53011 and WO99/20695.

Where appropriate, an $SiO_2$ (protective) layer can be applied on top of the titanium dioxide layer, for which the following method may be used: A soda water glass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the water glass solution, stirring is carried out for 30 minutes.

It is, in addition, possible to modify the powder color of the pigment by applying further layers such as, for example, colored metal oxides or Berlin Blue, compounds of transition metals, e.g. Fe, Cu, Ni, Co, Cr, or organic compounds such as dyes or color lakes.

It is furthermore possible to subject the finished pigment to subsequent coating or subsequent treatment which further increases the light, weather and chemical stability or which facilitates handling of the pigment, especially its incorporation into various media. For example, the procedures described in DE-A-22 15 191, DE-A-31 51 354, DE-A-32 35 017, DE-A-33 34 598, DE-A-4030727, EP-A-649886, WO97/29059, WO99/57204, and U.S. Pat. No. 5,759,255 are suitable as subsequent treatment or subsequent coating.

In addition, the pigment according to the invention can also be coated with poorly soluble, firmly adhering, inorganic or organic colorants. Preference is given to the use of color lakes and, especially, aluminum color lakes. For that purpose an aluminum hydroxide layer is precipitated, which is, in a second step, laced by using a color lake (DE-A-24 29 762 and DE 29 28 287).

Furthermore, the pigment according to the invention may also have an additional coating with complex salt pigments, especially cyan ferrate complexes (EP-A-141 173 and DE-A-23 13 332).

After the $SiO_y$-coated metal flakes have been calcined, as described in Variant (1), in a non-oxidizing gaseous atmosphere at a temperature above 600° C., preferably in the range of from 700 to 1100° C. for more then 10 minutes, preferably for several hours, they can also be caused to react in a gas tight reactor heatable to a maximum of about 1500° C., preferably in the form of loose material, with a carbon-containing gas selected from alkynes, for example acetylene, alkenes, for example methane, alkenes, aromatic compounds or the like, and mixtures thereof optionally in admixture with an oxygen containing compound, such as, for example, aldehydes, ketones, water, carbon monoxide, carbon dioxide or the like, or mixtures thereof, at from 500 to 1500° C., preferably from 500 to 1000° C., and advantageously with the exclusion of oxygen. In order to temper the reaction, an inert gas, for example argon or helium, may be admixed with the carbon-containing gas (WO03/68868).

At pressures of less than about 1 Pa the reaction generally also proceeds too slowly whereas, especially when the carbon-containing gases are less reactive or are highly diluted with inert gas, it is perfectly possible to operate at pressures of up to about 4000 bar, as are routinely used, for example, in HIP ("hot isocratic pressing") systems.

In such carbonization, it is possible for all of the $SiO_y$ to be reacted to form SiC; preferably from 5 to 90% by weight of the $SiO_y$ are reacted to form SiC. The temperature for the process of conversion of $SiO_y$ to SiC is from 500° to 1500° C., preferably from 500° C. to 1000° C., with a process duration of from about one hour to about twenty hours. The reaction takes place starting from the surface of the plane-parallel structures and accordingly results in a gradient rather than a sharp transition. This means that, in that embodiment, the SiC-containing layer consists of $(SiO_y)_a$ and $(SiC)_b$, wherein $0 \leq a < 1$ and $0 < b \leq 1$, with b being 1 and a being 0 close to the surface of the pigment and the amount of SiC approaching 0 close to the boundary with the $SiO_y$ substrate. The $SiO_y$ structures are sufficiently porous for such a reaction not to be limited only to the uppermost layer of $SiO_y$ molecules.

Awarding to this process variant pigments having the following layer structure, $SiC/SiO_y/core/SiO_y/SiC$, can be obtained, which can be converted to pigments having the following layer structure, $SiC/SiO_z/core/SiO_z/SiC$, by calcination in the presence of oxygen. The pigments obtained by this process are new and are a further subject of the present invention.

Instead of a layer of a metal oxide having a high index of refraction U.S. Pat. No. 6,524,381 materials, such as diamond-like carbon and amorphous carbon, can be deposited by plasma-assisted vacuum methods (using vibrating conveyors, rotating drum coaters, oscillatory drum coaters, and free-fall chambers) as described, for example in U.S. Pat. No. 6,524,381, on the $SiO_z$-coated metal substrates.

Consequently, the present invention also relates to plane-parallel structures (pigments) based on silicon oxide/metal substrates having on their surface a carbon layer especially a diamond-like carbon layer having a thickness of 5 to 150 nm, especially 20 to 50 nm.

In the method described, for example, in U.S. Pat. No. 6,015,597, diamond-like network (DLN) coatings are deposited onto particles from carbon-containing gases, such as, for example, acetylene, methane, butadiene and mixtures of these and optionally Ar, and optionally gases containing additional components by plasma deposition. Deposition occurs at reduced pressures (relative to atmospheric pressure) and in a controlled environment. A carbon rich plasma is created in a reaction chamber by applying an electric field to a carbon-containing gas. Particles to be coated are held in a vessel or container in the reactor and are agitated while in proximity to the plasma. Species within the plasma react on the particle surface to form covalent bonds, resulting in DLN on the surface of the particles.

The term "diamond-like network" (DLN) refers to amorphous films or coatings comprised of carbon and optionally comprising one or more additional components selected from the group consisting of hydrogen, nitrogen, oxygen, fluorine, silicon, sulfur, titanium, and copper. The diamond-like networks comprise approximately 30 to 100 atomic percent carbon, with optional additional components making up the remainder Metallic or non-metallic, inorganic platelet-shaped particles or pigments are effect pigments, (especially metal effect pigments or interference pigments), that is to say, pigments that, besides imparting color to an application medium, impart additional properties, for example angle dependency of the color (flop), lustre (not surface gloss) or texture. On metal effect pigments, substantially oriented reflection occurs at directionally oriented pigment particles. In the case of interference pigments, the imparting-imparting effect is due to the phenomenon of interference of light in thin, highly refractive layers.

The pigments according to the invention can be used for all customary purposes, for example for coloring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "Industrielle Organische Pigmente" (W. Herbst and K. Hunger, VCH Verlagsgesellschaft mbH. Weinheim/N.Y., 2nd, completely revised edition, 1995).

When the pigments according to the invention are interference pigments (effect pigments), they are goniochromatic and result in brilliant, highly saturated (lustrous) colors. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar color to the effect pigment. Especially interesting combination effects are obtained, however, in analogy to, for example, EP-A-388 932 or EP-A402 943, when the color of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic, organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as filmformers or binders for coatings or printing inks, such as, for example, boiled linseed oil, nitrocellulose, alkyd resins, melamine resins and urea-formaldehyde resins or acrylic resins.

Depending on the intended purpose it has proved advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for coloring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The (effect) pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the effect pigments according to the invention may be used singly. It is, however, also possible, in order to achieve different hues or color effects, to add any desired amounts of other impartingimparting constituents, such as white, colored, black or effect pigments, to the high molecular weight organic substances in addition to the effect pigments according to the invention. When colored pigments are used in admixture with the effect pigments according to the invention, the total amount is preferably from 0.1 to 10% by weight, based on the high molecular weight organic material.

Especially high goniochromicity is provided by the preferred combination of an effect pigment according to the invention with a colored pigment of another color, especially of a complementary color, with colorations made using the effect pigment and colorations made using the colored pigment having, at a measurement of 10°, a difference in hue ($\Delta H^*$) of from 20 to 340, especially from 150 to 210.

Preferably, the effect pigments according to the invention are combined with transparent colored pigments, it being possible for the transparent colored pigments to be present either in the same medium as the effect pigments according to the invention or in a neighbouring medium. An example of an arrangement in which the effect pigment and the colored pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in the high molecular weight organic material being pigmented, and processing a pigment composition according to the invention, are preferably carried out subject to conditions under which only relatively weak shear forces occur so that the effect pigment Is not broken up into smaller portions.

Plastics comprising the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The colorations obtained, for example in plastics, coatings or printing inks, especially in coatings or printing inks, more especially in coatings are distinguished by excellent properties, especially by extremely high saturation, outstanding fastness properties and high goniochromicity.

When the high molecular weight material being pigmented is a coating, it is especially a speciality coating, very especially an automotive finish.

The effect pigments according to the invention are also suitable for making-up the lips or the skin and for coloring the hair or the nails.

The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations. The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecaneoxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminum.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers);

suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York,1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof) panthenol pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers. If the preparations are in the form of a powder, they consist substantially of a mineral or inorganic or organic filler such as, for example, talcum, kaolin, starch, polyethylene powder or polyamide powder, as well as adjuvants such as binders, colorants, etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

The Examples that follow illustrate the invention without limiting the scope thereof. Unless otherwise indicated, percentages and parts are percentages and parts by weight, respectively.

EXAMPLES

Example 1

A layer of NaCl having a thickness of about 50 nm is evaporated in a vacuum chamber on a metal carrier at a pressure below about $10^{-2}$ Pa. Then at the same pressure the following layers are deposited successively: SiO, Al and SiO, wherein a film having the following layer structure is formed on the metal carrier:

SiO(270 nm)/Al(40 nm)/SiO(270 nm)

Subsequently, the separating agent is dissolved in deionised water, the (SiO/Al/SiO) layer, which is insoluble, breaks up into flakes. The suspension is, at atmospheric pressure, concentrated by filtration and rinsed several times with deionised water in order to remove $Na^+$ and $Cl^-$ ions that are present. After drying $SiO_y$-coated aluminum flakes are obtained, which show bright metallic colors.

The obtained $SiO_y$-coated aluminum flakes are heated in an argon atmosphere with a temperature gradient of 100° C./minute up to 750° C., i.e. above the melting point of aluminum. The obtained flakes show a matt green/yellow color and are partly transparent.

The thus obtained pigments are coated with $TiO_2$ (20 nm) by a wet chemical method: The $SiO_y$-coated aluminum flakes are suspended in fully deionized water and heated to 75° C. To this suspension an aqueous solution of $TiCl_4$ is metered. The pH is kept constant at pH=2.2 by means of 32% sodium hydroxide solution. After this solution has been added, the mixture is stirred for a further approximately 30 minutes at 75° C. The thus obtained pigments are characterized by bright green/yellow colors and show depending on the viewing angle color flop.

To further increases the light, weather and chemical stability, the pigments may be oxidized using air at a temperature of 200° C. in the form of loose material in a fluidized bed.

Example 2

In a vacuum chamber the following layers are successively sublimed on a glass substrate at a pressure below about $10^{-2}$ Pa: $TiO_2$ (50 nm), SiO (270 nm), Al (50 nm), SiO (270 nm) and $TiO_2$ (50 nm). One specimen is used as reference specimen (RS), the other specimen (S) is heated in an argon atmosphere 0.5 hours at 700° C.

The reflection color (CIE-L*C*h) of the specimen (S) and the reference specimen (RS) is determined at irradiation with standard illuminant $D_{65}$ under a 10°, 30° and 50° observation angle:

| Specimen | Calcination | Viewing Angle [Grad] | L* | a* | b* | c* | h |
|---|---|---|---|---|---|---|---|
| RS | no | 10 | 98 | 9.7 | 5.2 | 11 | 28.1 |
| RS | no | 30 | 99.5 | 0.2 | 15.8 | 15.8 | 89.1 |
| RS | no | 50 | 100 | −8.5 | 16.5 | 18.6 | 117 |
| S | yes | 10 | 70 | −6.4 | −3.0 | 7 | 205 |
| S | yes | 30 | 68.4 | −11.7 | −7.6 | 13.9 | 213 |
| S | yes | 50 | 64.8 | −13.8 | −16.8 | 21.7 | 230.6 |

The invention claimed is:

1. A pigment, comprising
(A) optionally a layer consisting of a metal,
(B) at least one layer, which is located between the layers (A) and (C), if a layer (A) is present, and consists of the metal, silicon (Si) and oxygen (O), obtained by calcination of plane-parallel structures (flakes) comprising at least one layer consisting of a metal and at least one layer consisting of $SiO_z$ with $0.70 \leq z \leq 2.0$, in a non-oxidizing atmosphere and
(C) optionally a layer consisting of $SiO_z$ on layer (B), wherein $0.70 \leq z \leq 2.0$,
wherein the metal of layer A. when present. is the metal of layer B.

2. A pigment according to claim 1, comprising layer (B) and
(C) at least one layer consisting of $SiO_z$ on layer (B), wherein $0.70 \leq z \leq 2.0$.

3. A pigment according to claim 2, wherein $1.40 \leq z \leq 2.0$.

4. A textile, coating, paint, printing ink, plastic, composition, cosmetic preparation, or a glaze for ceramic and glass, comprising a pigment according to claim 2.

5. The pigment according to claim 1, comprising
(C1) a layer consisting of $SiO_z$,
(B) which is located between the layers (C1) and (C2),
(C2) at least one layer consisting of $SiO_z$ on layer (B), wherein $0.70 \leq z \leq 2.0$.

6. The pigment according to claim 5, comprising
(D) an additional layer of a material having an index of refraction greater than about 1.65.

7. The pigment according to claim 6, comprising
(D1) a layer of a material having an index of refraction greater than about 1.65,
(C1) a layer consisting of $SiO_z$,
layer (B) which is located between the layers (C1) and (C2),
(C2) a layer consisting of $SiO_z$, and
(D2) a layer of a material having an index of refraction greater than about 1.65,
wherein $0.70 \leq z \leq 2.0$.

8. A pigment according to claim 7, wherein $1.40 \leq z \leq 2.0$.

9. The pigment according to claim 7, wherein the material comprising layers (D1) and (D2) is $TiO_2$.

10. The pigment according to claim 6, wherein the material comprising the additional layer (D) having a high index of refraction is selected from the group consisting of $TiO_2$, amorphous carbon, diamond-like carbon and silicon carbide.

11. The pigment according to claim 5 having the following layer structure:

$TiO_2/SiO_z/core/SiO_z/TiO_2$, wherein the core is formed of a layer (B) or of a layer (B)/layer (A)/layer (B), wherein the layer (B) is present on the plane-parallel faces, but not the side faces of layer (A), wherein the $SiO_z$ layer is only present on the plane-parallel faces, but not the side faces and the $TiO_2$ layer is applied to the whole surface; $SiC/SiO_z/core/SiO_z/SiC$, or
$C/SiO_z/core/SiO_z/C$, wherein $0.70 \leq z \leq 2.0$.

12. The pigment according to claim 1, wherein the metal is selected from Ag, Al, Cu, Cr, Mo, Ni, Ti, or alloys thereof.

13. A textile, coating, paint, printing ink, plastic composition, cosmetic preparation, or a glaze for ceramic and glass, comprising a pigment according to claim 1.

14. A pigment according to claim 1, wherein $1.40 \leq z \leq 2.0$.

15. A textile, coating, paint, printing ink, plastic, composition, cosmetic preparation, or a glaze for ceramic and glass, comprising a pigment according to claim 14.

16. A pigment, obtained by calcination of plane-parallel structures (flakes), comprising (A) at least one layer consisting of a metal and (C) at least one layer consisting of $SiO_z$ with $0.70 \leq z \leq 2.0$, in a non-oxidizing atmosphere and optionally coating of the obtained flakes with further layers.

17. A textile, coating, paint, printing ink, plastic, composition, cosmetic preparation, or a glaze for ceramic and glass, comprising a pigment according to claim 16.

* * * * *